(12) United States Patent
Buell et al.

(10) Patent No.: US 6,988,954 B1
(45) Date of Patent: Jan. 24, 2006

(54) WEED CUTTING GOLF CLUB

(76) Inventors: John Clark Buell, 8513 W. Mauna Loa La., Peoria, AZ (US) 85381; Troy Nicholas Nowell, 8752 W. Michelle Dr., Peoria, AZ (US) 85382

(*) Notice: Subject to any disclaimer, the term of this patent is extended or adjusted under 35 U.S.C. 154(b) by 0 days.

(21) Appl. No.: 10/965,431

(22) Filed: Oct. 14, 2004

Related U.S. Application Data

(60) Provisional application No. 60/587,667, filed on Jul. 14, 2004.

(51) Int. Cl.
*A63B 53/04* (2006.01)
*A01G 3/06* (2006.01)

(52) U.S. Cl. ............... 473/131; 473/282; 473/324; 473/219; 473/226; 30/276; 56/12.7

(58) Field of Classification Search ........... 473/131, 473/221, 219, 226, 282, 408, 324; 30/276, 30/293, 300; 172/13; 56/16.7, 12.7; D8/8
See application file for complete search history.

(56) References Cited

U.S. PATENT DOCUMENTS

| | | | | |
|---|---|---|---|---|
| 4,651,422 A | * | 3/1987 | Everts | 30/347 |
| 4,733,868 A | * | 3/1988 | Seiden | 473/138 |
| 4,823,464 A | * | 4/1989 | Gorski | 30/276 |
| 4,845,889 A | * | 7/1989 | Taylor | 47/32.4 |
| 5,950,317 A | * | 9/1999 | Yates et al. | 30/276 |
| 6,296,575 B1 | * | 10/2001 | Harris | 473/286 |
| 6,517,445 B1 | * | 2/2003 | O'Neill | 473/226 |
| 2002/0098903 A1 | * | 7/2002 | Antler | 473/282 |

* cited by examiner

*Primary Examiner*—Sebastiano Passaniti
(74) *Attorney, Agent, or Firm*—Parsons & Goltry; Robert A. Parsons; Michael W. Goltry

(57) ABSTRACT

A weed cutting golf club includes a shaft terminating in a clubhead, the clubhead defining a compartment having a downwardly directed opening. A power source is carried by one of the clubhead and the shaft. A motor is carried within the compartment and coupled to the power source. A drive shaft extends in a downward direction from the motor through the opening and terminates in a hub. Cutting members extend from the hub.

16 Claims, 2 Drawing Sheets

WEED CUTTING GOLF CLUB

CROSS-REFERENCE TO RELATED APPLICATION

This application claims the benefit of U.S. Provisional Application No. 60/587,667, filed 14 Jul. 2004.

FIELD OF THE INVENTION

This invention relates to weed cutting devices.

More particularly, the present invention relates to novelty golfing accessories.

BACKGROUND OF THE INVENTION

Novelty items for entertainment and function have long been used and sought after in various industries. The golf industry is replete with novelty items which may or may not have functional value. Regardless of their functional value, novelty items often provide humor and stress relieving qualities desirable in various situations. As popularity in the sport of golf increases, more and more individuals find themselves on a golf course. Often these individuals are less than expert, and can find themselves in situations which may prove stressful if not embarrassing. When playing golf for recreation, it may be desirable to lighten the mood and decrease stress levels in order to provide a more relaxing and enjoyable atmosphere.

Currently, there are golf clubs which included blades allowing them to pass through to haul grass or weeds a more efficient manner. While somewhat useful for an individual having a bad lie in deep grass or weeds, they do little to relieve the inherent stress in the situation.

It would be highly advantageous, therefore, to remedy the foregoing and other deficiencies inherent in the prior art.

Accordingly, it is an object the present invention to provide a weed cutting golf club for relief of stress.

SUMMARY OF THE INVENTION

Briefly, to achieve the desired objects of the present invention in accordance with a preferred embodiment thereof, provided is a weed cutting golf club. The weed cutting golf club includes a shaft terminating in a clubhead, the clubhead defining a compartment having a downwardly directed opening. A power source is carried by one of the clubhead and the shaft. A motor is carried within the compartment and coupled to the power source. A drive shaft extends in a downward direction from the motor through the opening and terminates in a hub. Cutting members extend from the hub.

In a more specific aspect, the weed eater golf club further includes a bottom plate removably attached to a bottom of the clubhead closing the opening and concealing the hub and cutting members. In another aspect of the present invention, the motor includes an electric motor and the power source includes batteries. A control can further be provided for controlling the operation of the motor. The control can include an on/off switch for completing a circuit between the power source and the motor in the on position.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
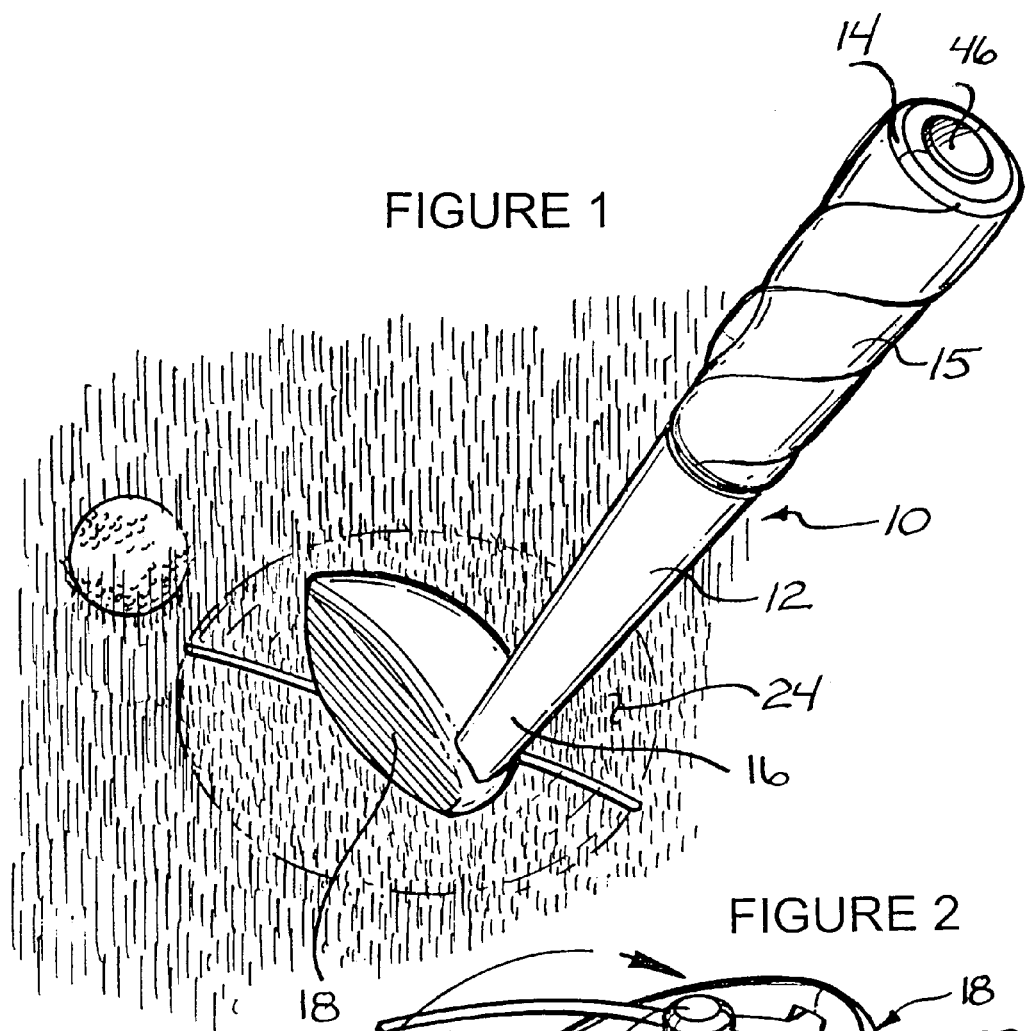
FIG. 1 is a perspective view of a weed cutting golf club according to the present invention, as it would appear in use.
Figures 3, 4:
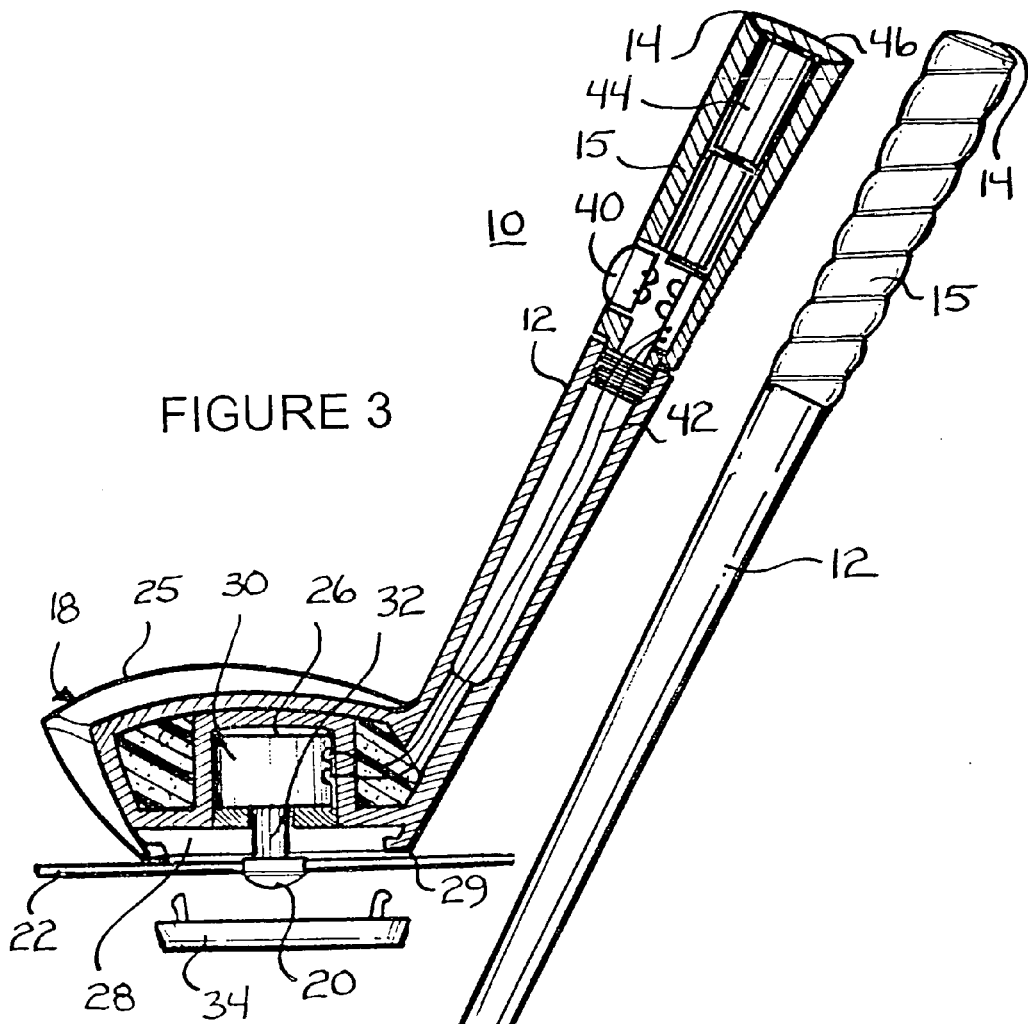
FIG. 3 is a sectional side view of the weed cutting golf club of FIGS. 1 and 2.
FIG. 4 is a side view of the weed cutting golf club in use.

Turning now to the drawings in which like reference characters indicate corresponding elements throughout the several views, attention is directed to FIGS. 1 and 4 which illustrate a weed cutting golf club generally designated by the reference numeral 10. Weed cutting golf club 10 consists of a shaft 12 having a grip end 14 received by a grip 15, and an opposing end 16. Opposing end 16 terminates in a clubhead 18. It will be understood that grip end 14 and grip 15 may be formed in a single unitary piece as opposed to being two separate elements. Additionally, shaft 12 and clubhead 18 may also be formed in a unitary piece. The intent of the construction is to mimic the appearance of a golf club. Weed cutting golf club 10 is intended to look like a driver (Wood or metal wood) style club, and can be fabricated of wood, plastic, metal, ceramic, composite material, combinations thereof, and the like.

It will also be understood that weed cutting golf club 10 may be fabricated in substantially any size a small size, for example, 12 inches, for easy carrying or display on a desktop to full club size and any size in between. In a desk top size, clubhead 18 could be weighted in a manner to allow weed cutting golf club 10 to stand in an upright position. In a preferred embodiment, however, weed cutting golf club 10 is modeled on a full-size wood or metal wood style club. As can be seen in FIGS. 1 and 4, the lower portion of clubhead 18 includes a rotating hub 20 from which cutting members 22 extend. Cutting members 22 may be flexible blades, or as is preferred, flexible line extending from hub 20. Rapid rotation of hub 20 spins cutting members 22 in a cutting zone 24 for cutting weeds, which in this specific application includes conventional weeds, grass, shrubbery, etc.

Figure 2:
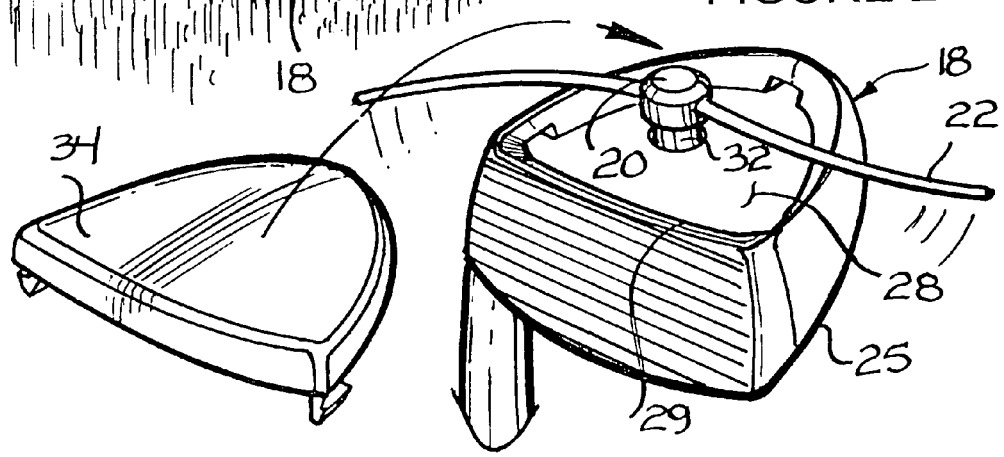
FIG. 2 is a perspective view of a clubhead of the weed cutting golf club with a cover removed.

Turning now to FIGS. 2 and 3, weed cutting golf club 10 is illustrated in greater detail. Clubhead 18 includes a top surface 25, and a compartment 26 having an opening 28 directed downwardly away from top surface 25 and toward a bottom 29 of clubhead 18. Compartment 26 carries a motor 30 which includes a drive shaft 32 extending downwardly and terminating in hub 20. Opening 28 is closable by a bottom plate 34 removably coupleable to bottom 29 of clubhead 18. Bottom plate 34 can be removably attached in substantially any manner. For example, bottom plate 34 can be attached to hub 20 and moved between a retracted or closed position and an extended position allowing cutting members 22 egress from opening 28. In a preferred, simpler embodiment as shown, bottom plate 34 includes engagement elements 36 receivable by bottom 29 of clubhead 18. Thus, bottom plate 34 snaps onto bottom 29 closing opening 28 when attached. When bottom plate 34 is detached, cutting members 22 can extend from hub 20 out of opening 28 in a weed cutting configuration.

Referring specifically to FIG. 3, weed cutting golf club 10 includes a control 40 controlling the operation of motor 30. In a preferred embodiment, control 40 consists of a simple on/off switch which closes a circuit between electrical leads 42 extending from motor 30 inside shaft 12 to batteries 44. When control 40 is moved to an on position, a circuit is completed between motor 30 and batteries 44. It will, however, be understood by one skilled in the art that control 40 can include additional features such as speed control, and the like. Additionally, while batteries 44 are employed as a power source, other power sources may be employed. Furthermore, while batteries 44 are shown carried at grip end 14 of shaft 12, they may be positioned anywhere in shaft 12 or in clubhead 18. It has been found that replacement of batteries 44 is easily accomplished when positioned in grip end 14 of shaft 12 closed by a lid 46. Batteries 44 can be replaced by removing lid 46 removing the old batteries and inserting new batteries.

While an electric motor 30 with a power source including batteries 44 are preferred, one skilled in the art will understand that other more powerful motors may be employed to provide greater functionality. For example, motor 30 may be replaced with a gas operated motor if desired, with fuel tanks located in the shaft. It also will be readily apparent that a gas driven motor must be sufficiently small to be carried within clubhead 18 and reserves of fuel will be necessarily in small quantities for the same reasons.

Other infuriated accessories and may be attached to weed cutting golf club 10 as desired. For example, a glove holder, score cardholder, water bottle holder, money clip, laser pointer, compass, distance seeker, water squirter, tee holder, divot repair tool holder, knife, scissors, fishing accessories, pen and/or pencil, clock, flashlight, or any other similar gadget can be carried by weed cutting golf club 10.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same,

What is claimed is:

1. A weed cutting golf club comprising:
   a shaft terminating in a clubhead, the clubhead defining a compartment having a downwardly directed opening;
   a power source carried by one of the clubhead and the shaft;
   a motor carried within the compartment and coupled to the power source;
   a drive shaft extending in a downward direction from the motor through the opening and terminating in a hub; and
   cutting members extending from the hub.

2. A weed cutting golf club as claimed in claimed 1 further comprising a control for controlling the operation of the motor.

3. A weed cutting golf club as claimed in claim 2 wherein the control includes an on/off switch for completing a circuit between the power source and the motor in the on position.

4. A weed cutting golf club as claimed in claim 1 further comprising a bottom plate removably attached to a bottom of the clubhead closing the opening and concealing the hub and cutting members.

5. A weed cutting golf club as claimed in claim 1 wherein the motor includes an electric motor and the power source includes batteries.

6. A weed cutting golf club as claimed in claim 5 wherein the batteries are carried within the shaft.

7. A weed cutting golf club comprising:
   a shaft terminating in a clubhead, the clubhead defining a compartment having a downwardly directed opening;
   a power source carried by one of the clubhead and the shaft;
   a motor carried within the compartment and coupled to the power source;
   a drive shaft extending in a downward direction from the motor through the opening and terminating in a hub;
   cutting members extending from the hub; and
   a bottom plate removably attached to a bottom of the clubhead closing the opening and concealing the hub and cutting members.

8. A weed cutting golf club as claimed in claimed 7 further comprising a control for controlling the operation of the motor.

9. A weed cutting golf club as claimed in claim 8 wherein the control includes an on/off switch for completing a circuit between the power source and the motor in the on position.

10. A weed cutting golf club as claimed in claim 7 wherein the motor includes an electric motor and the power source includes batteries.

11. A weed cutting golf club as claimed in claim 10 wherein the batteries are carried within the shaft.

12. A weed cutting golf club comprising:
    a shaft having a grip end and an opposing end;
    the opposing end terminating in a clubhead, the clubhead defining a compartment having a downwardly directed opening;
    batteries carried by one of the clubhead and the shaft;
    an electric motor carried within the compartment and coupled to the batteries;
    a drive shaft extending in a downward direction from the electric motor through the opening and terminating in a hub;
    cutting members extending from the hub; and
    a bottom plate removably attached to a bottom of the clubhead closing the opening and concealing the hub and cutting members.

13. A weed cutting golf club as claimed in claimed 12 further comprising a control for controlling the operation of the motor.

14. A weed cutting golf club as claimed in claim 13 wherein the control includes an on/off switch for completing a circuit between the batteries and the electric motor in the on position.

15. A weed cutting golf club as claimed in claim 12 wherein the batteries are carried within the grip end of the shaft.

16. A weed cutting golf club as claimed in claim 15 wherein the batteries are held in position in the grip end of the shaft by a removable lid.

* * * * *